UNITED STATES PATENT OFFICE.

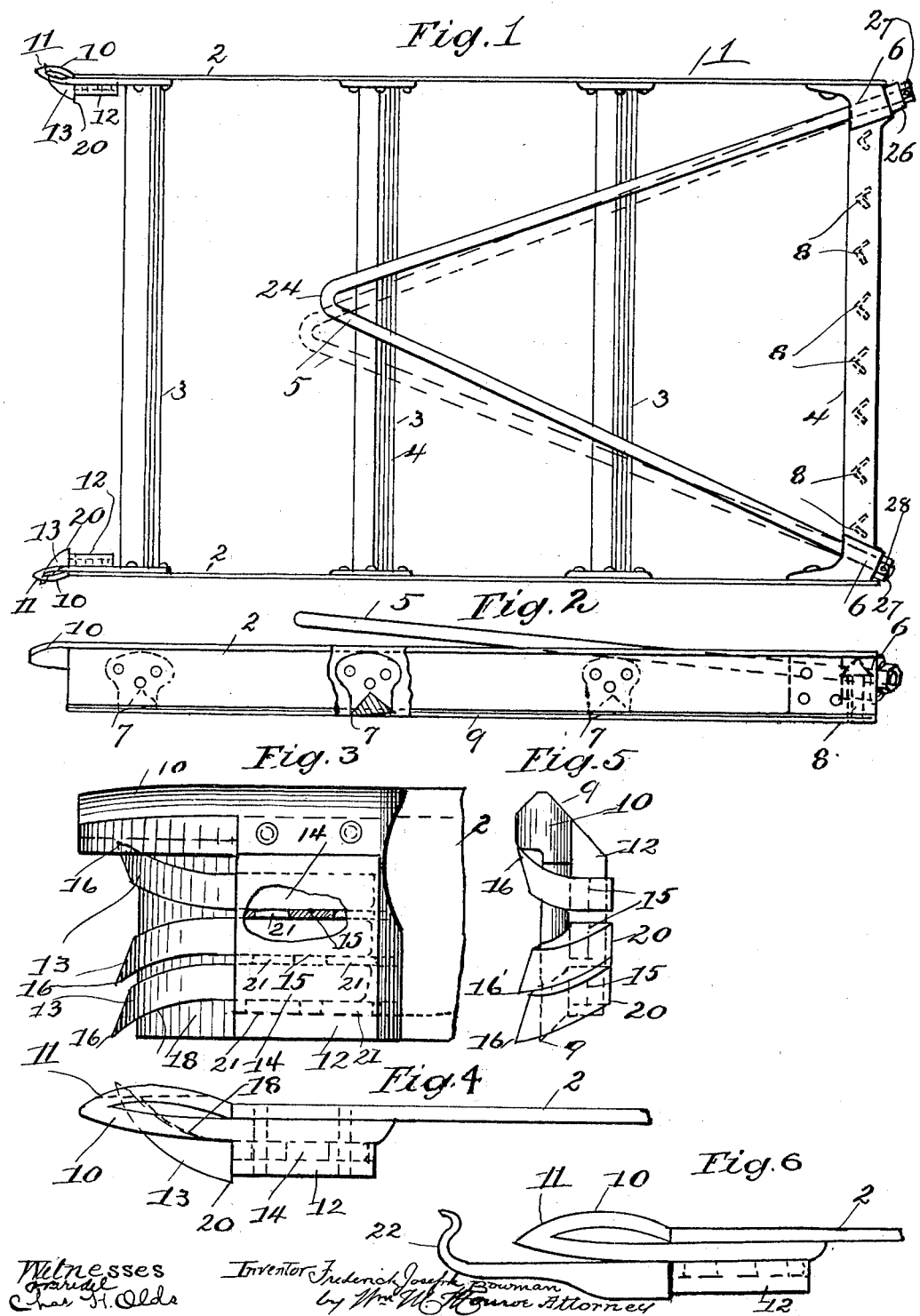

FREDERICK JOSEPH BOWMAN, OF CLEVELAND, OHIO.

MECHANICAL CHISELING AND CLEANING DEVICE.

1,112,972.   Specification of Letters Patent.   Patented Oct. 6, 1914.

Application filed November 24, 1913. Serial No. 802,757.

*To all whom it may concern:*

Be it known that I, FREDERICK JOSEPH BOWMAN, a citizen of the United States, and resident of Cleveland, in the county of Cuyahoga and State of Ohio, have invented certain new and useful Improvements in Mechanical Chiseling and Cleaning Devices, of which I hereby declare the following to be a full, clear, and exact description, such as will enable others skilled in the art to which it appertains to make and use the same.

The primary objects of the invention are to provide simple, practical, and efficient mechanical scraping or channeling devices for removing the incrustation of ore upon the side walls of a zinc roasting kiln, or furnace, which will gradually collect thereon and will gradually prevent the employment of the rake ordinarily used for cleaning the bottom, by diminishing the size of the opening and causing the outer ends of the rake to wedge or jam in the opening.

It also includes guiding means for the rake arranged to bring the ends of the rake and channeling device alternately into engagement with the opposite walls of the kiln. To obtain this result, to the pilot or guiding front edges of the rake are attached removable and reversible channeling tools which readily remove the incrustation and are so disposed as to be protected by the pilots from injury, and are also prevented thereby from gouging and injuring the walls of the kiln or furnace.

The invention comprises the construction of the various parts and method of mounting the channeling tools, and means for guiding the rake to give action to the tools upon opposite walls of the kiln, as hereinafter described, shown in the accompanying drawings and specifically pointed out in the claims.

In the accompanying drawings Figure 1 is a plan view of the rake showing the pilot members and channeling devices attached thereto; Fig. 2 is a side elevation thereof; Fig. 3 is an enlarged side elevation of one of the pilot members showing the attached channeling tools; Fig. 4 is a plan view thereof; Fig. 5 is an enlarged end elevation of one of the pilot members; Fig. 6 is a perspective view of a modified form of spring channeling tool.

In these views 1 is the rake formed of steel side bars 2, 2, and transverse bars 3 and 4, and 5 is a looped draw bar or attaching means adjustably attached to the rear ends 6, 6 of the rear cross bar 4.

The transverse bars 3, 3 are provided with forwardly and downwardly turned scraping edges 7, 7 which raise the incrustation of roasted ore from the bottom of the kiln, and the rear cross bar 4 is provided with raking teeth 8, 8, which break up the material as it is scraped from the bottom of the kiln. These teeth may be integral with the cross bar 4.

The side bars 2, 2, are preferably formed of steel plate and are provided with beveled edges 9, 9 which slide along upon the bottom with as little friction as possible. To the front ends of these side bars are attached the cast metal pilot members 10, 10 which make contact with the side walls of the kiln and are outwardly curved at 11, 11 so as to guide the forward ends of the rake without catching upon the rough surfaces of the walls. To these castings are attached the socket members 12, 12, to which the channeling tools 13, 13 are secured. The channeling tools 13, 13, are provided with stems 14, 14, which are inserted in the socket openings 15, 15, in the socket members, and the tools are provided with cutting or channeling edges 16, 16, which on each side of the rake project substantially into the plane of the outer edge of the pilot thereon. To accomplish this result the tools are curved outward at 17, 17 below the projecting portions of the pilot members, and the castings which compose these members are outwardly curved at 18, 18, and form rigid bearing surfaces conforming to the curvature of the tools and thus provide rigid supports therefor, which prevent the tools from bending or breaking. In the side elevation three tools are shown arranged one above the other with overlapping lower edges so as to break joints and channel a wide continuous path. The cutting edges are preferably turned downwardly so as to overlap each other, but the tool upon one side can be made to point upward by removing it to the other side, and thus the tools are capable of being used as rights and lefts at pleasure. Each tool is provided with a projecting shoulder 20, which prevents the shank from being inserted too far in the socket. The shoulders also project beyond the socket members so that the tools can be driven out of the sockets with a mallet. The sockets are arranged one above each other, and to prevent dust from accumulating therein and thus choking the openings so as to prevent the insertion of the shank, vertical openings 21, 21 are arranged in vertical rows in line with each other, through which the dust will fall as the shanks are inserted in their sockets. The openings preferably grow larger toward the lower end of each line to facilitate the dropping of the dust. To remove any incrustation upon the walls in advance of the pilot members long spring tools having goose necks 22, can be employed in addition to the rigid tools as shown in Fig. 6 to clear a passage for the pilot. This normally projects beyond the pilot but its spring action prevents it from damaging the wall of the kiln.

It would not be possible to employ the cutting tools upon both sides of the rake simultaneously. For this reason means must be employed to force one cutting side at a time against its adjacent wall. For this reason a draw bar 5 is employed having a central attaching loop or eye 24, and each end of the draw bar is adjustably attached to its bearing 6. This is not used except when the accumulation of incrustation prevents the progress of the pilot. A simple means for accomplishing this adjustment is shown. One end of the draw bar is pulled through its bearing and a looped plate or washer 26 is placed over the projecting end of the draw bar, and is retained in place by means of a nut 27. In this manner the central loop is pulled over to one side or the other from the center and the rake is thrown over according to the side from which the incrustation is to be removed, and a chain or tackle of any sort is attached to the loop, thus pressing the channeling tools upon one side of the wall only at a time.

The nuts 27, 27 can be retained upon the ends of the draw bar by means of pins 28, 28, and washers of any desired width can be kept in stock to permit of any amount of lateral displacement of the loop of draw bar desired.

The invention has been found extremely efficient and practical in use in the place of manual labor which involves hot dusty and dirty work, which is detrimental to the health of the operator, since the fine dust of the zinc ore is injurious to the throat and lungs and eyes of the operator.

Having described the invention what I claim as new and desire to secure by Letters Patent is:

1. In a chiseling device for a furnace, the combination with side bars of pilot members secured to their forward extremities, said pilot members provided with projecting outwardly curved portions, socket members secured to said pilot members and channeling tools projecting from said socket portions and inserted in the sockets in said socket members.

2. In a chiseling device for a furnace, in combination, a frame composed of side bars and transverse bars, a portion of said transverse bars having scraping members attached thereto, a laterally adjustable attaching means for said rake, pilot members attached to the front extremities, socket members attached to said pilot members, and channeling tools inserted in said socket members, said laterally adjustable attaching means permitting the alternate engagement of the channeling tools upon side bars of the rake.

3. In a chiseling device for a furnace, the combination with side bars, of pilot members secured to the front ends of the side bars, socket members secured thereto and outwardly turned channeling tools inserted in said sockets, said pilot members provided with curved surfaces forming bearings for said tools.

4. In a chiseling device for a furnace, the combination with side bars, of projecting pilot members secured thereto, socket members attached to said side bars, outwardly extending channeling tools inserted in said sockets, one above the other, and having overlapping cutting edges, the sockets in said socket members provided with communicating openings for the discharge of dust.

5. In a chiseling device for a furnace, in combination, a side bar therefor, a pilot member attached thereto and having a projecting upper edge, a socket member attached to said pilot member, rigid channeling tools detachably secured in said socket member, and a spring channeling tool detachably secured in said socket member, substantially as described.

6. In a chiseling device, side bars, pilot members having outwardly curved points secured to said side bars, sockets inserted in the pilot members, channeling tools inserted in said sockets and a spring channeling tool extending in front of and adapted to provide a path for each pilot member.

In testimony whereof, I hereunto set my hand this 18th day of October 1913.

FREDERICK JOSEPH BOWMAN.

In presence of—
  CHAS. H. OLDS,
  WM. M. MONROE.

---

Copies of this patent may be obtained for five cents each, by addressing the "Commissioner of Patents, Washington, D. C."